May 23, 1967 F. C. BRYANT ETAL 3,321,211
RUNNER ATTACHMENT
Filed Sept. 22, 1965
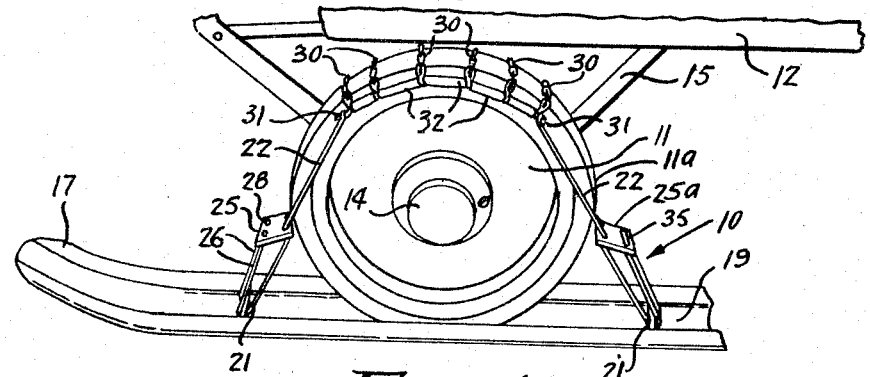
FIG. 1
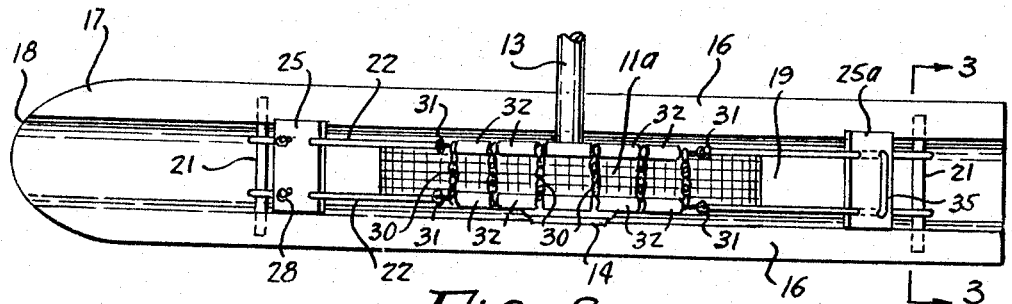
FIG. 2
FIG. 3
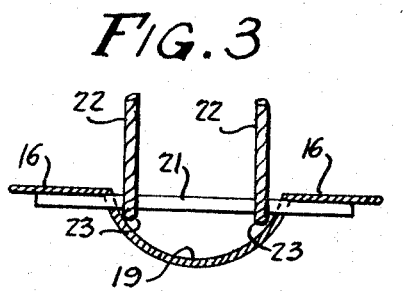
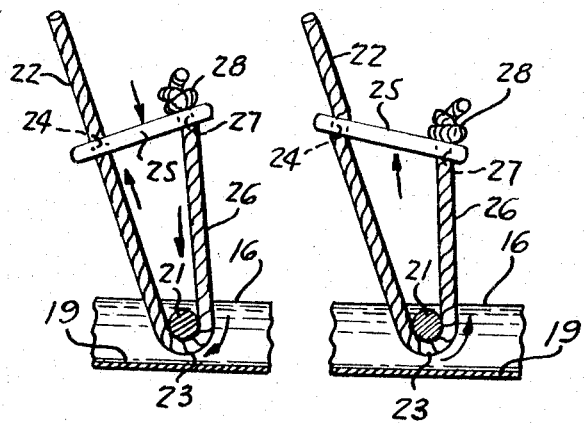
FIG. 4   FIG. 5
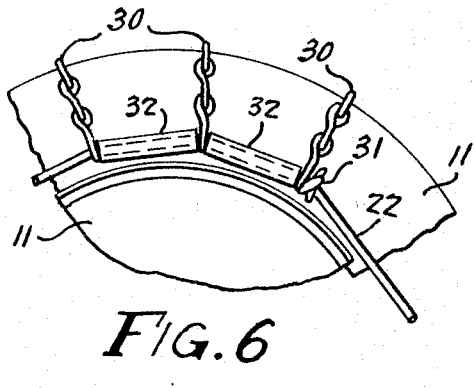
FIG. 6
FLOYD C. BRYANT
JAMES R. SMITH
INVENTORS.
By Kimmel, Crowell & Weaver
ATTORNEYS.

United States Patent Office 3,321,211  
Patented May 23, 1967

3,321,211  
RUNNER ATTACHMENT  
Floyd C. Bryant, 4842 Gilmore Drive, and James R. Smith, 4885 Oglethorpe Place, both of Charlotte, N.C. 28209  
Filed Sept. 22, 1965, Ser. No. 489,135  
4 Claims. (Cl. 280—13)

This invention relates to a runner attachment for a wheeled vehicle, and has as its primary object the provision for attachable and detachable runner, which is adapted to be attached to an individual wheel of a wheeled vehicle, such as a tricycle or wagon, or the like for converting the same into a runner type vehicle such as a sled.

While the invention has particular applicability to a child's toy such as the aforesaid tricycle or wagon it is to be understood that it may be readily applied with equal facility to a full sized vehicle such as an automobile, truck or the like.

A further object of the invention is the provision of a device of this character which may be attached to and detached from the wheels of the vehicle with a minimum of effort and difficulty, which is readily adjustable to a variety of diameters and widths of wheels.

Still another object of the invention is the provision of a device of this nature which, when fastened to the wheel will be maintained securely in position, so as to substantially preclude rotation of the wheel, or slippage of the device about the periphery of the wheel.

A further object of the invention is the provision of a device of this nature which is sturdy and durable in construction, reliable and efficient in operation, and relatively simple and inexpensive to manufacture, install and utilize.

Other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a perspective view of one form of device embodying the instant inventive concept shown as applied to the wheel of a vehicle, such as a child's wagon.

FIGURE 2 is an enlarged top plan view of the structure of FIGURE 1.

FIGURE 3 is a sectional view taken substantially along the line 3—3 of FIGURE 1 as viewed in the direction indicated by the arrows on an enlarged scale.

FIGURE 4 is a fragmentary sectional view showing the cord or cable lock in open or releasing position.

FIGURE 5 is a view similar to FIGURE 4 but showing the cable in locked position.

FIGURE 6 is a fragmentary side elevational view showing the constructional detail.

Similar reference characters refer to similar parts throughout several views of the drawing.

Having reference to the drawing in detail, the runner of the instant invention is generally indicated at 10, and is disclosed in FIGURES 1 and 2 as being attached to the wheel 11 of the vehicle 12, the wheel being supported on the usual axle 13 topped by a hub 14, connecting struts 15 supporting the axle from the frame.

The runner of the instant invention comprises an elongated body portion 16, of the length materially in excess of the diameter of the wheel, and having an upturned front tip 17, which is rounded as at 18, as best shown in FIGURE 2.

An elongated concavo-convex groove 19 extends substantially the full length of the runner, and is adapted to receive the lower rim or tire 11a of the vehicle.

Front and rear transverse pins 21 extend beneath the body portion 16 and across the concave side of groove 19, at a point spaced from the bottom thereof, the pins being longitudinally spaced on opposite sides of the wheel.

A pair of cords or cables 22 are looped as at 23 each at its opposite end around each pin 21, the cords passing through bores or openings 24 and rectangular locking or clamping plates 25. The upwardly extending ends 26 of the looped cords are then passed through additional bores or apertures 27 in the same locking plate, and the ends of the cords are knotted at 28 to secure the same in position.

Extending transversely between the opposite cords are a plurality of chain links 30, which are adapted to engage across the top of the tire 11a or the wheel rim, the chains being secured to the cable in any desired manner, knots 31 being provided in the cables at the opposite ends of the full extent of the chain links. The chain links are suitably spaced by means of tubular spacers 32, which may be comprised of plastic, or any other desired material, and which surround the cords between the links.

Instead of knotting the ends of a pair of cords, a single cord may be used and as shown at the right of FIGURES 2 and 3 may be extended transversely as at 35 between apertures 27a, in one plate 25, so that the entire adjustment is afforded at the opposite end of the device. Alternatively, each cord may be knotted at each end if desired.

In the use and operation of the device one or both of the locking plates 25 may be moved to the position shown in FIGURE 4, so that the cord or cable 22 will pass freely and smoothly through its associated opening 24. The wheeled vehicle is then seated in the groove 19, and the plate or plates 25 moved upwardly along the cords 22 until the chain links 30 tightly clamp about the wheel tire or the rim. At this point by pressing upwardly on the edge of plate 25 remote from the knots 28 or the transverse portion of the rope 35, the openings or apertures 24 are biased to knik the cords 22, thus effectively locking the device in position and against slippage. With the plates locked and the device in position as shown it will be seen that there is provided an effective and secure ski for the wheel of the vehicle, it being understood that a ski is provided for each wheel, which will effectively transform the device into a sled, thus materially enhancing its entertainment value, or in cases of utilitarian vehicles rendering it applicable to usage under conditions where the use of a wheeled vehicle would be impractical.

It will also be seen that there is herein provided a device which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

We claim:

1. A device for converting a wheeled vehicle into a sled comprising a plurality of runners, one adapted to be appplied to each wheel of the vehicle, each runner comprising an elongated body having an upturned forward end, a groove extending longitudinally of the body, a pair of spaced transverse pins extending across said groove and spaced from the bottom thereof, a pair of runner securing cords each cord having one end looped around each pin, an apertured securing plate adjacent each pin, each cord extending through an aperture in said plate before looping around the adjacent pin, the looped end of each cord then being extended through another opening in said plate, means at the end of each cord for securing the looped end thereof against withdrawal from its associated aperture, and chain links extending transversely between the pair of cords adapted to engage closely over the rim of the adjacent wheel.

2. The structure of claim 1 wherein said groove is concavo-convex with the convex side extending downwardly through the runner and forming a guiding rib of arcuate cross section.

3. The structure of claim 2 wherein spacers are provided on said cords between said chain links.

4. The structure of claim 3 wherein said plates may be tilted to lock said cords in taut position around said pins, and wherein the looped ends of said cords are knotted to form the means for securing the ends from withdrawal from their associated apertures.

References Cited by the Examiner

UNITED STATES PATENTS

| | | | |
|---|---|---|---|
| 1,146,504 | 7/1915 | Knapp | 280—13 |
| 1,225,998 | 5/1917 | Ollivier | 280—13 |
| 1,694,215 | 12/1928 | Golembiewski | 280—13 |

BENJAMIN HERSH, *Primary Examiner.*

L. D. MORRIS, *Assistant Examiner.*